(12) United States Patent
Uchida

(10) Patent No.: US 6,222,995 B1
(45) Date of Patent: Apr. 24, 2001

(54) LENS-FITTED PHOTO FILM UNIT, AND METHOD OF MAKING PHOTO-PRINT

(75) Inventor: Mitsuhiro Uchida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/425,962

(22) Filed: Oct. 25, 1999

(30) Foreign Application Priority Data

Oct. 27, 1998 (JP) .................................................. 10-305646
Mar. 24, 1999 (JP) .................................................. 11-080419

(51) Int. Cl.$^7$ ............................... G03B 7/00; G03B 15/03
(52) U.S. Cl. ............................. 396/6; 396/155; 396/213; 396/458; 396/563
(58) Field of Search ............................... 396/6, 213, 166, 396/179, 155, 236, 176, 458, 242, 243, 244, 563; 358/521

(56) References Cited

U.S. PATENT DOCUMENTS 5,543,883 * 8/1996 Green ................................... 396/563
5,721,963 * 2/1998 Iwagaki et al. ........................... 396/6

FOREIGN PATENT DOCUMENTS 1-130118    9/1989  (JP) .

\* cited by examiner

*Primary Examiner*—W. B. Perkey
(74) *Attorney, Agent, or Firm*—Young & Thompson

(57) ABSTRACT

A lens-fitted photo film unit can take indoor- and night-photographs at adequate tone- and color-reproductions, by satisfying the condition:

$$-6 \leq 2\log_2(A) + \log_2(1/T) - \log_2(0.3 \cdot S) \leq 5$$

wherein T, A and S represents the shutter speed, the aperture size, and the ISO film speed. The film speed is determined to be not less than ISO640, and more preferably not less than ISO1000. The guide number (ISO100·m) of a flash device of the film unit is set to be in a range from 0.1 to 8, more preferably from 1 to 6, and most preferably from 3 to 5, and satisfies the condition: $8.0 \leq \log_2(G^2) + \log_2(1/T) \leq 12.0$, in combination with the shutter speed T.

15 Claims, 11 Drawing Sheets

—— : EXAMPLE 1
---- : PRIOR ART

LENS-FITTED PHOTO FILM UNIT, AND METHOD OF MAKING PHOTO-PRINT

BACKGROUND OF THE INVENTION

1. Field of the Invention

The present invention relates to a lens-fitted photo film unit containing a roll of unexposed photo film and having simple photographic mechanisms incorporated therein, and a method of making photo-prints. Particularly, the present invention relates to a lens fitted-photo film unit having a flash device and being suited for indoor- and night-photography, and a method of making photo-prints from picture frames photographed by that lens-fitted photo film unit.

2. Background Arts

A variety of lens-fitted photo film units, hereinafter referred to as film units, have been developed and marketed. Many of them have a flash device so that it is possible to take photographs at night or indoors where the subject is too dark for photography.

Because most of the conventional film units have a fixed shutter speed, a fixed aperture size and a film speed, these values are suited for daylight photography. On the other hand, the flash device is so designed that a main subject in a range from about 1 m to 4 m is illuminated suitably.

Since the film unit is basically adjusted to daylight photography, a picture photographed with a flashlight by the film unit tends to contain an over-exposed main subject and an under-exposed background. Moreover, a picture taken by the film unit with the flashlight in a room illuminated by fluorescent lights will be tinged with an ugly greenish hue in those portions where the flash does not reach, when it is printed on the basis of a color temperature of the flashlight. This is because the color temperature of the flashlight is different from that of the fluorescent light.

Specifically, although the fluorescent light is visually a white light or around, and the object illuminated by the fluorescent light visually shows its object color, photosensitive layers for green of most kinds of photo films are more sensitive to the fluorescent light than other color photosensitive layers. On the other hand, the flashlight is almost neutral for spectral sensitivity of the photo film. As a result, the background illuminated by the fluorescent light alone will be tinged with the ugly greenish hue, called ugly green, when printed without any color correction.

If, on the contrary, that picture is printed on the basis of the color temperature of the fluorescent light, and if there is a human subject, the magenta hue of the flesh color becomes so strong that the human subject looks like drunken. This is because magenta, the complementary color to green, is enhanced in the whole area of the picture to cancel the greenish hue.

SUMMARY OF THE INVENTION

In view of the foregoing, an object of the present invention is to provide a film unit by which it is possible to photograph both the main subject and the background at adequate exposure conditions either in daylight photography or in flash-photography.

Another object of the present invention is to provide a film unit that can take a negative frame from which a photo-print of adequate color reproductions and density gradations may be obtained, even if the negative frame is photographed with the flashlight under fluorescent lighting or in a dark place. Providing a printing method for the film unit of the present invention is also an object of the present invention.

A further object of the present invention is to provide a method of making photo-prints, by which high-quality photo-prints are produced from picture frames photographed by the film unit of the present invention.

The above objects will be achieved when the film unit satisfies the following requirements:

1) The background is photographed at a tolerable exposure level.

2) The main subject is photographed at an adequate exposure level.

3) Out-of-focus range excluded from the depth of field is within a permissible range, while the handshake is restricted to a tolerable degree.

4) Color reproduction of flesh color of a main human subject is adequate.

5) The failure due to under-exposure is reduced.

Concerning the fifth requirement, it is possible to take some measure for this requirement in the printing stage, instead of or in addition to taking some measure on the film unit.

In order to satisfy the first requirement, the inventor of the present invention first made a research on photographic circumstances wherein ordinary users of the film units take photographs. As a result, it was found that illuminance of backgrounds was not less than 75 lx in most indoor- and night-photographs. Then, experiments were made to determine how much system sensitivity is necessary for the film unit in order to obtain satisfactory photo-prints when the pictures are taken in such indoor circumstances. Specifically, twenty typical indoor scenes were photographed by each of six samples having different system sensitivities.

System sensitivity is defined by the following formula:

$$2\log_2(A) + \log_2(1/T) - \log_2(0.3 \cdot S)$$

wherein A represents an aperture size, T represents a shutter speed in the unit of second, and S represents an ISO sensitivity or film speed.

In the experiments, the six samples had the same film speed S of ISO800 and the same aperture size A of F5.6, whereas the shutter speed T was changed gradually from each other. The photographed pictures were developed and printed in a standard photographic process, and each of consequent photo-prints was examined as to whether the main subject and the background were adequately reproduced. The results of the examination are shown in Table 1.

TABLE 1

| SYSTEM SENSITIVITY | RATE OF ADEQUATE PRINTS |
|---|---|
| −8 | 5% |
| −4 | 70% |
| 0 | 85% |
| 2 | 95% |
| 4 | 50% |
| 6 | 5% |

According to the results of the examination, it was proved that the main subject and the background may be photographed adequately in most scenes when the system sensitivity was in a range from −5 to 5, and more preferably from −2 to 4. When the system sensitivity was in a range from 1 to 3, almost all scenes were photographed adequately.

Accordingly, to satisfy the first requirement, the system sensitivity of the film unit of the present invention is defined in the range from −6 to 5, more preferably from −2 to 4, and most preferably from 1 to 3.

Since the above conditions of the system sensitivity are suited for indoor- or night-photography, the film unit of this system sensitivity can not always take adequate photographs in daylight or under sufficiently bright lighting. Therefore, it is preferable to mount an exposure control mechanism in the film unit that allows switching over the system sensitivity of the film unit by manually or automatically changing the aperture size A or the shutter speed T. Thereby the exposure amount may be controlled according to the photographic circumstances, e.g., depending upon whether it is indoor- or night-photography or daylight-photography. The easiest way to change the system sensitivity is to switch over the aperture size A and/or the shutter speed T between two different values each in cooperation with an ON-OFF operation for the flash device. In that case, the aperture size A should be enlarged or the shutter speed T should be increased when the flash device is turned off. An exposure control mechanism that switches over the aperture size in cooperation with the ON-OFF operation of the flash device is disclosed for example in JPU 1-130110.

To satisfy the second requirement, the film unit should preferably be provided with a flash device that projects an appropriate amount of flashlight, or guide number of the flash device is optimum. Light distribution characteristics of the flash device are also important. In results of intensive examinations of the inventor, it was proved that the second requirement was satisfied when the illuminating angle of the flash device is widened. Specifically, as shown in FIG. 12, the illuminating angle is widened such that the amount of flashlight at points P2 and P3, which are located on an object plane above and below a photographic field 80, is not less than 60% of the amount of flashlight at a center point P1 of the photographic field 80. The points P2 and P3 are located at a vertical angle of 1.5θ relative to the center point P1 of the photographic field 80, wherein θ represents a vertical angle of a top margin or a bottom margin of the photographic field 80 relative to the center point P1. More preferably, the amount of flashlight at the points P2 and P3 is not less than 80% of the amount of flashlight at the center point P1.

The illuminating angle conventionally means an angle of a point relative to an optical axis, where the amount of light is 50% of the maximum light amount at the optical axis. It has conventionally been considered that adequate photographs can be taken when the amount of flashlight at the edge of an area of the image plane included in the angle of view is not less than 50% of the amount of flashlight at the center point P1. However, where the system sensitivity is designed to photograph the background as well as the main subject, the picture quality can be badly influenced by the background lighting because of the difference in color temperature between the background lighting and the flashlight. By widening the illuminating angle, the flashlight will partly be reflected from the sealing or the flour, so the reflected flashlight, so-called bounce light, also illuminates the background. Thereby, the bad influence of the background lighting is reduced.

It was also found by experiments that placing an appropriate diffusion plate in front of the flash device is effective to widen the illuminating angle.

To determine which guide number of the flash device is optimum, experiments were made by use of five samples whose guide number is zero, that is, where the flash device was not activated. The film speed S and the aperture size A and the shutter speed T were respectively ISO800, F5.6, and 1/30 sec., in either of these samples. The system sensitivity of each sample was in a range defined to satisfy the first requirement. After photographing twenty typical indoor scenes by each of the five samples, the photo films were developed and printed in a standard photographic process. Each photo-print was examined as to whether the main subject illuminated by the flashlight was reproduced properly, and whether the density rate of the background to the main subject was adequate. The results of the examination are shown in Table 2.

TABLE 2

| G (ISO100 · m) | RATE OF ADEQUATE PRINTS |
|---|---|
| 0 | 5% |
| 2 | 85% |
| 4 | 95% |
| 6 | 80% |
| 10 | 25% |

According to these results, to satisfy the second requirement, the guide number G of the flash device of the film unit should be in a range from 0.1 to 8, more preferably from 1 to 6, and most preferably from 3 to 5.

It is also possible to satisfy the second requirement by adjusting the guide number G and the shutter speed T in combination. To determine the optimum combination, twenty typical scenes were photographed by each of six samples wherein $\log_2 (G^2) + \log_2 (1/T)$ is different from each other. The film speed S and the aperture size A are respectively ISO800 and F5.6 in either sample. Each of the consequent photo-prints was examined in the same aspects as above, and the results of the examination are shown in Table 3.

TABLE 3

| T (sec) | G (ISO100 · m) | $\log_2 (G^2) + \log_2 (1/T)$ | RATE OF ADEQUATE PRINTS |
|---|---|---|---|
| 1/8 | 3.2 | 6.3 | 35% |
| 1/15 | 3.5 | 7.5 | 85% |
| 1/30 | 3.9 | 8.8 | 95% |
| 1/60 | 3.9 | 9.8 | 80% |
| 1/80 | 5.0 | 11.0 | 70% |
| 1/200 | 5.0 | 12.3 | 45% |

According to these results, $\log_2 (G^2) + \log_2 (1/T)$ of the film unit should preferably be in a range from 7.0 to 12.0, and more preferably from 8.0 to 10.0. Thereby, the main subject is photographed at a proper exposure level, while the density reproduction of the background is maintained in a satisfactory range. It is to be noted that the film unit can achieve the second requirement by satisfying these conditions regardless of whether it satisfies the system sensitivity condition for the first requirement.

Where the film unit has an exposure control mechanism that enlarges the aperture size A for daylight photography, it is desirable to make the film unit capable of enlarging the guide number G in accordance with the enlarged aperture size A. Thereby, it comes to be possible to obtain adequate photo-prints in daylight synchronized flash photography that is often used for a subject rear-lighted by daylight.

To satisfy the third requirement, it is necessary to elongate the depth of field by enlarging the aperture size A to reduce the out-of-focus range, and also increase the shutter speed T to reduce the risk of handshake. To achieve these while satisfying the system sensitivity condition for the first requirement, the film unit is loaded with a photo film whose film speed S is high. By setting $\log_2$ (0.3·S) at a large value, it comes to be possible to select a large aperture size A and a high shutter speed T. Specifically, the film speed S is preferably not less than ISO640, and more preferably not less than ISO1000.

To satisfy the fourth requirement, that is, to print the flesh color adequately, the inventor studied the fact that the most important factor that hinders the flesh color from being reproduced properly is the difference in color temperature on the photo film between the flashlight and the fluorescent light. In conclusion, it was found that it is possible to reduce the influence of the fluorescent light on the color reproduction of the photo-prints when the film unit satisfies one of the following conditions:

I: $0 \leq \sqrt{(a^*)^2+(b^*)^2} \leq 5.0$

II: $0 \leq \sqrt{(a^*)^2+(b^*)^2} 15.0$ and $0° \leq Y \leq 100°$

III: $0 \leq \sqrt{(a^*)^2+(b^*)^2} \leq 15.0$ and $210° \leq Y \leq 360°$ wherein a* and b* represent chromaticness indices or psychromatic chroma coordinates in CIE 1976 L*a*b* color space, called CIELAB color space, that are measured in a way as set forth later, and correspond to a light-source color of a fluorescent lamp relative to a light-source color of the flash device of the film unit. Y=0° when a*, b*=0. Y=$\tan^{-1}$ (b*/a*) when either a* or b* is not zero, wherein $0° \leq \tan^{-1}$ (b*/a*) $\leq 90°$ when a*>0 and b*$\geq$0;

$90° \leq \tan^{-1}$ (b*/a*) $\leq 180°$ when a*$\leq$0 and b*$\geq$0;

$180° \leq \tan^{-1}$ (b*/a*) $\leq 270°$ when a*<0 and b*$\leq$0;

$270° \leq \tan^{-1}$ (b*/a*) $\leq 360°$ when a*>0 and b*$\leq$0.

The chromaticness indices a* and b* to be applied to the above condition formulas (I) and (III) are those values measured in the following sequence:

(1) Expose the photo film at a proper level to light reflected from a gray reflection plate with a reflection factor of 18%, called a standard reflection plate, while using the flash device of the film unit as the light source;

(2) Expose the photo film at proper level to light reflected from the standard reflection plate while using a fluorescent lamp defined as F6 type by JIS Z 8719 as the light source;

(3) Print the image of the standard reflection plate photographed by use of the flashlight at the first step onto a photographic paper under various conditions, and determine such a printing condition under which CIELAB chromaticness indices a* and b* of the standard reflection plate on the consequent photo-print have a value zero (a*=0, and b*=0);

(4) Print the image of the standard reflection plate photographed by use of fluorescent light at the second step onto the same photographic paper under the printing condition determined in the third step;

(5) Measure CIELAB chromaticness indices a* and b* of the standard reflection plate on the photo-print obtained in the fourth step, and use them as the chromaticness indices a* and b* in the above condition formulas.

It is to be noted that the standard illuminants of D65 should be used when measuring CIELAB chromaticness indices a* and b* in the third and fifth steps.

The chromaticness indices a* and b* measured in the fifth step specify the color of the standard reflection plate photographed under the fluorescent light as coordinates in a CIELAB color space whose reference point (a* and b*=0) corresponds to the color of the standard reflection plate photographed under the flashlight.

Accordingly, $\sqrt{(a^*)^2+(b^*)^2}$ represents a color difference between the light-source color of the flash device and that of the fluorescent lamp. On the other hand, $\tan^{-1}$ (b*/a*) represents the direction of the color difference:$\sqrt{(a^*)^2+(b^*)^2}$.

By satisfying the condition (I), the color difference between the illuminat color of the flash device and that of the fluorescent lamp get is reduced on the photo film, so the flesh color of a human subject illuminated by the flashlight and the background illuminated by the fluorescent light are tinged with a similar hue to each other on the photo film. Therefore, color correction for canceling the hue of the background in the printing stage would have less influence on the flesh color, so the flesh color may be reproduced adequately on the photo-print.

The second and third conditions (II) and (III) define that even where there is a certain color difference between the light-source color of the flash device and that of the fluorescent lamp on the film unit, if the color difference is within a predetermined range and in a predetermined direction, it is possible to reproduce the flesh color adequately on the photo-print, while preventing the background from being tinged with the ugly green. The direction of color difference is defined such that the light-source color of the fluorescent lamp is reproduced in a range from red to yellow and from blue to magenta on the photo-print when the color balance is determined such that the light-source color of the flash device is reproduced as a neutral gray (a*=0, and b*=0). In this way, the background would not be tinged with the ugly green.

The conditions (I) to (III) may be satisfied in the film unit by adjusting spectral energy of the flashlight of the flash device and spectral sensitivity of the photo film. The spectral energy of the flashlight may be adjusted by providing a protector of the flash device with a dye-colored filter or by coloring the protector itself. The spectral sensitivity of the photo film may be adjusted by controlling respective spectral sensitivities of photosensitive emulsion layers for blue, green and red of the photo film, and/or by providing another photosensitive emulsion layer to control interlayer effect.

To satisfy the fifth requirement, it is desirable to elongate the latitude of exposure of the photo film in an under-exposure range. That is, by elongating the latitude, i.e. the linear range of density characteristic curve of the photo film in the lower exposure range, tone-reproduction of an under-exposed photograph is improved. Also, by elongating the latitude also in an over-exposure range, tone-reproduction of an over-exposed photograph is improved. Instead of elongating the latitude of the photo film itself, it is possible to achieve the same effect by correcting image data pieces of under-exposed portions in a digital printer such that the gradient of the under-exposure range of the characteristic curve is virtually closed to the gradient of the linear range. It is also desirable for satisfying the fifth requirement to provide the film unit with such an exposure control mechanism as mentioned above.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
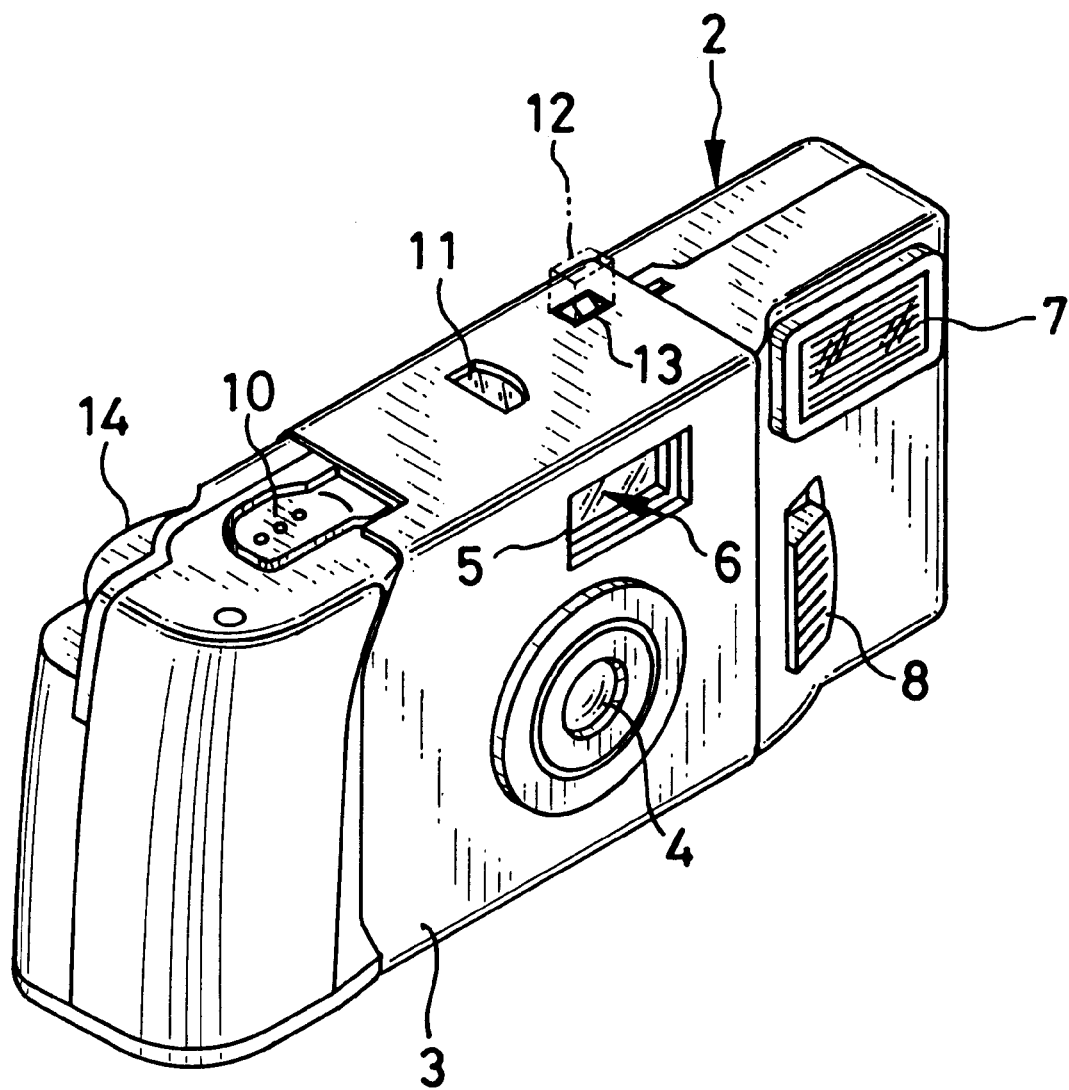
FIG. 1 is a perspective view of a film unit according to an embodiment of the present invention.

FIG. 1 shows a film unit embodying the present invention. The film unit is suited for flash-photography in relatively dark circumferences, such as outdoors at night and indoors, such that not only a main subject illuminated by a flashlight but also its background where the flashlight scarcely reaches are reproduced adequately. Hereinafter, the film unit according to the present invention will be referred to as an indoor film unit.

The indoor film unit consists of a unit body 2 and a label 3. The unit body 2 has a taking lens 4, an objective window 5 of a viewfinder 6, a flash projector 7, a flash ON-OFF operation member 8, a shutter button 10, a frame counter window 11, an opening 13 for protruding out a light guide 12, and a film winding wheel 14. A not-shown eyepiece window is formed in a rear side of the unit body 2 in opposition to the objective window 6. The label 3 is put around a middle zone of the unit body 2 by adhesives, and is formed with openings for exposing the taking lens 4, the viewfinder 6, the frame counter window 11 and the opening 13.

Figure 2:
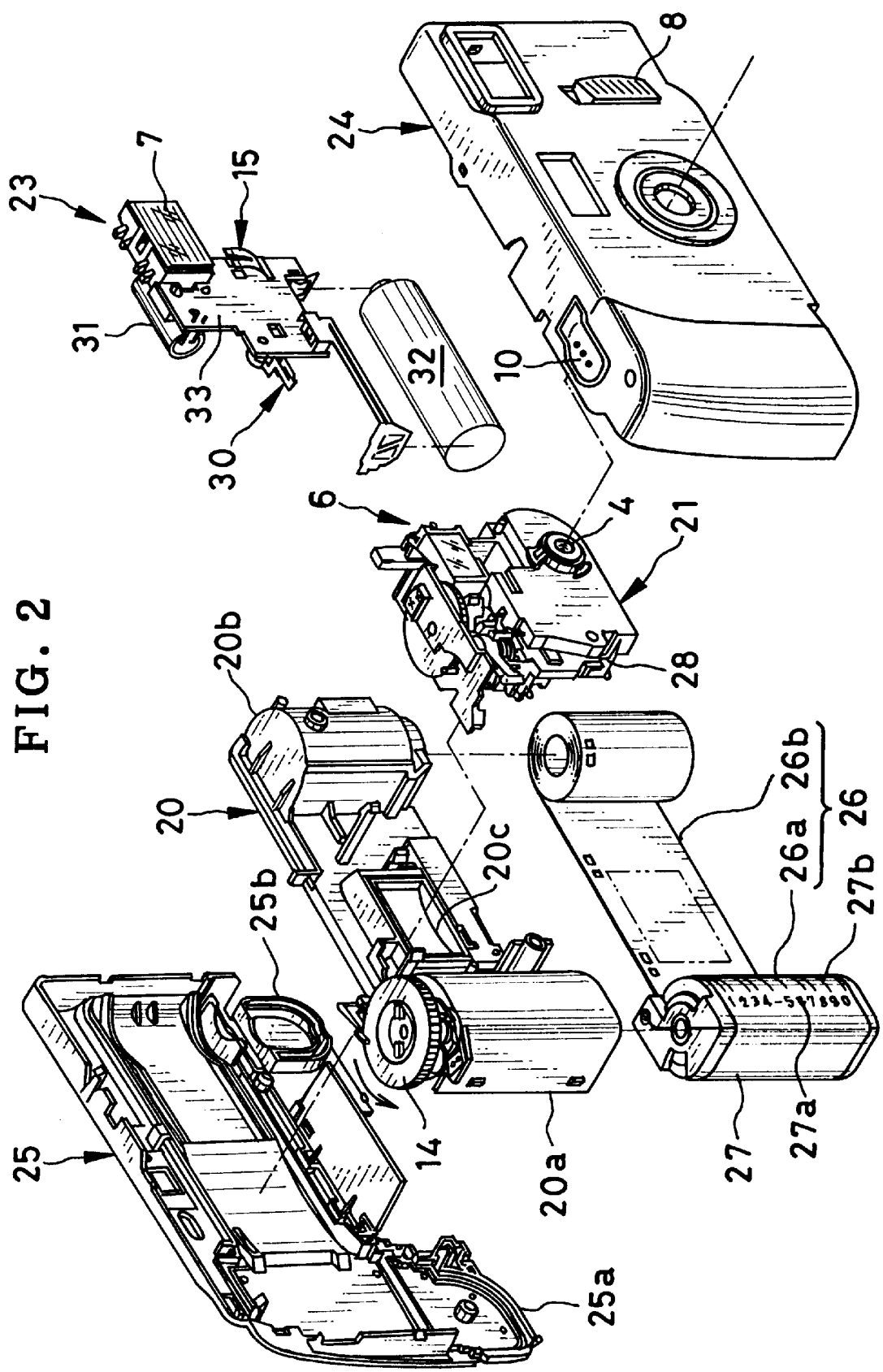
FIG. 2 is an exploded perspective view of a unit body of the film unit of FIG. 1.

As shown in FIG. 2, the unit body 2 consists of a base portion 20, an exposure device 21, a flash device 23, a front cover 24 and a rear cover 25. The base portion 20 has a cartridge chamber 20a and a film roll chamber 20b on opposite sides of an exposure aperture 20c. A cartridge shell 26a and a roll of filmstrip 26b of an IX240 type photographic film cartridge 26 are loaded in the cartridge chamber 20a and the film roll chamber 20b in the factory. Thereafter, the rear cover 25 is attached to the rear side of the base portion 20, and bottom lids 25a and 25b close bottoms of these chambers 20a and 20b in a light-tight fashion.

A label 27 put on the cartridge shell 26a has a numeral code 27a and a bar code 27 that represent film data on the filmstrip 26b and an ID number of the cartridge shell 26a. The filmstrip 26a has a magnetic recording layer on its base side for allowing various data to be recorded thereon. The filmstrip 26b also has numeral codes and bar codes photographically recorded as latent images on its margins out of frame recording areas. Accordingly, it is possible to make photographing processing of the filmstrip 26b with reference to the data recorded on the filmstrip 26b or the data recorded on the label 27.

In addition to those data items which are recorded on other conventional photo film cartridges, the photo film cartridge 26 for the indoor film unit is provided with film data specific to the indoor film unit. Also, the film speed or ISO sensitivity of the filmstrip 26b satisfies the conditions as specified above that are required by the present invention. In this embodiment, the filmstrip 26b is a negative film.

The film winding wheel 14 is engaged with a spool of the cartridge shell 26a so that the filmstrip 26b may be wound into the cartridge shell 26a by rotating the film winding wheel 14 in a counterclockwise direction as shown by an arrow in FIG. 2.

The flash device 23 has the flash projector 7, a flash switch 15, a trigger switch 30, a main capacitor 30, a battery 32 and other necessary circuit elements mounted integrally on a printed circuit board 33. The flash switch 15 is turned on by setting the flash ON-OFF operation member 8 to an upper ON position. Then, the flash device 23 starts charging the main capacitor 30. Setting the flash ON-OFF operation member 8 to a lower OFF position turns the flash switch 15 off. Then, the charging operation is interrupted, or the flash device 23 is stopped from flashing even after the main capacitor 30 is charged up.

The light guide 12 protrudes out of the opening 13 in cooperation with the flash ON-OFF operation member 8 being set in the ON position. In the protruded position, the light guide 12 conducts light from a not-shown LED to the outside, that is included in the flash device 23 and emits light when the main capacitor 30 is charged up.

The flash projector 7 has a protector 7a mounted in front of a not-shown flash discharge tube. The protector 7a is a Fresnel lens like as a conventional flash projector 7. In front of the protector 7a, a diffusion plate 7b, which is fitted in a flash window of the front cover 24, is disposed to widen the illuminating angle of flashlight from the flash projector 7. As described above with reference to FIG. 12, the light distribution characteristics of the flashlight from the flash projector 7 are so designed that the amount of flashlight at the points P2 and P3 located at a vertical angle of 1.5θ relative to a center point P1 of a photographic field 80, wherein θ represents a vertical angle of a top margin or a bottom margin of the photographic field 80 relative to the center point P1, is not less than 60% of the amount of flashlight at the center point P1.

The light distribution characteristics of the flashlight may be controlled by adjusting the shape or other optical properties of the protector 7a and/or the diffusion plate 7b. It is alternatively possible to place a diffusion plate in front of the flash discharge tube and place a Fresnel lens in front of the diffusion plate. It is also possible to obtain the predetermined light distribution characteristics by mounting a protector or a diffusion plate alone.

In addition to this configuration, the protector 7a may be combined with a dye-colored filter or may be colored itself, to adjust spectral energy of the flashlight so as to satisfy the above described conditions (I) to (III).

The exposure device 21 has the taking lens 4, photographic mechanisms including a shutter mechanism, and an optical system of the viewfinder 6 integrally mounted on a light-shielding box 28. The exposure device 21 is attached to the base portion 21 in front of the exposure aperture 20c.

Figure 3:
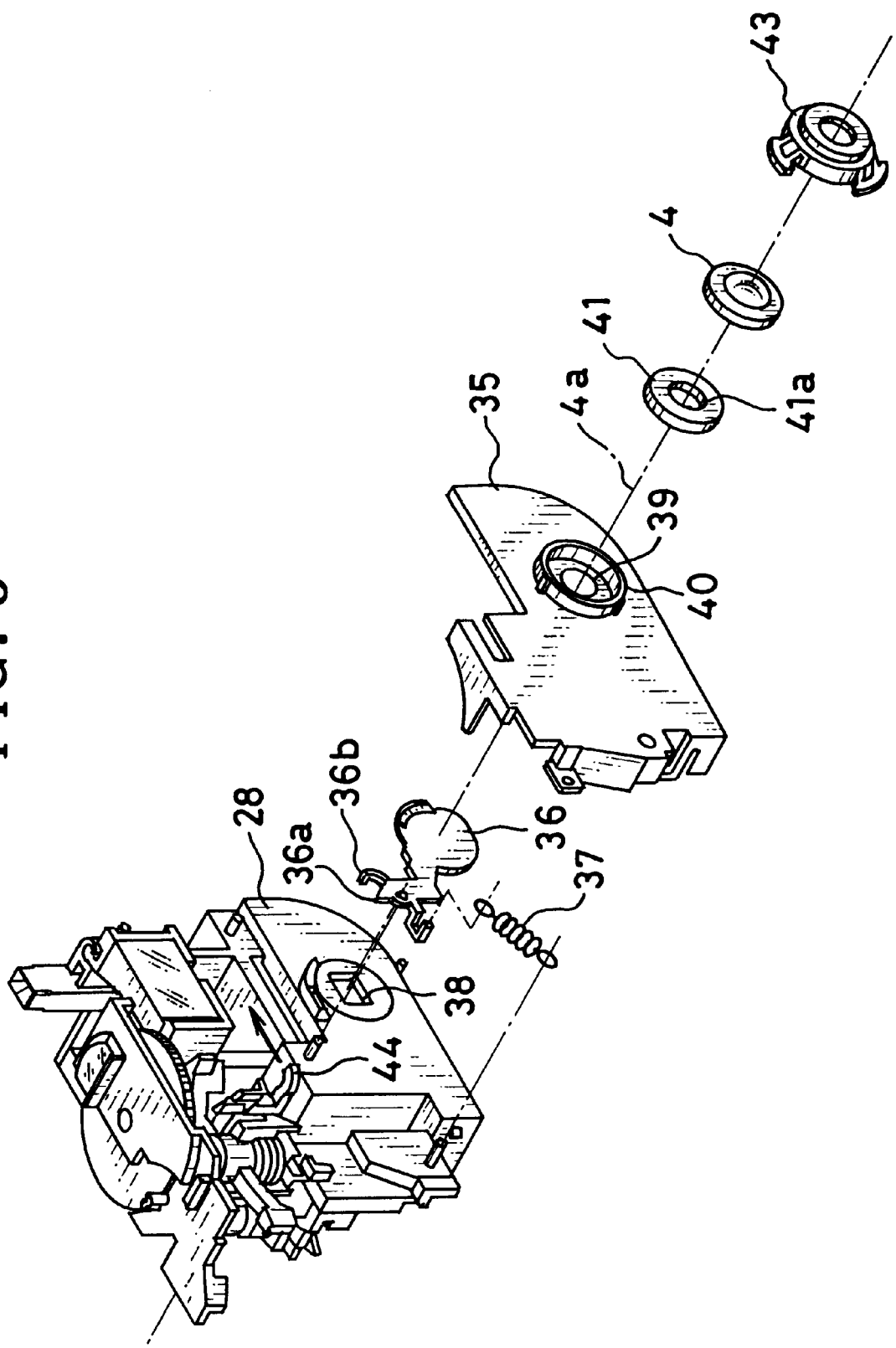
FIG. 3 is a partly exploded perspective view of an exposure device of the film unit of FIG. 1.

As shown in FIG. 3, a shutter blade 36 is on a front wall of the light-shielding box 28, and is urged by a spring 37 to a closed position closing a shutter opening 38. A shutter cover 35 is mounted in front of the shutter blade 36. The shutter cover 35 has a lens opening 39 in correspondence with the shutter opening 38, and a lens barrel 40 is formed around the lens opening 39. A stop plate 51 having a stop aperture 41a and the taking lens 4 are placed in the lens barrel 40 and secured by a lens holder 43. Designated by 4a is an optical axis of the taking lens 4.

When the shutter button 10 is pushed, a striking level 44 of the shutter mechanism moves in a direction of an arrow in FIG. 3, striking an upper tip 36a of the shutter blade 36. Thereby, the shutter blade 36 swings clockwise against the urging force of the spring 37, and then returns to the closed position according to the force of the spring 37. As a result, the shutter opening 38 is opened for a predetermined time, so the filmstrip 26b placed behind the exposure aperture 20c is exposed to light entering through the taking lens 4, the stop aperture 41a, the lens opening 39 and the shutter opening 38. Also when the shutter blade 36 fully opens the shutter opening 38, an arm 36b of the shutter blade 36 pushes one switch blade of the trigger switch 30 to contact with the other switch blade, thereby turning on the trigger switch 30. If the main capacitor 31 is charged up and the flash switch 15 is ON at that time, the flash projector 7 projects the flashlight.

The opening time of the shutter opening 38 by the shutter mechanism corresponds to the shutter speed T. The diameter of the stop aperture 41a corresponds to the aperture size A, and the amount of flashlight projected from the flash projector 7 corresponds to the guide number G of the flash device 23. The shutter speed T, the aperture size A and the guide number G are designed to satisfy the above described conditions in combination with the film speed of the filmstrip 26b. These values are fixed in this embodiment, but it is preferable to make it possible to change the shutter speed T, the aperture size A and/or the guide number G in order to reduce possibility of bad quality pictures in daylight photography or intolerably under-exposed pictures.

Figure 4:
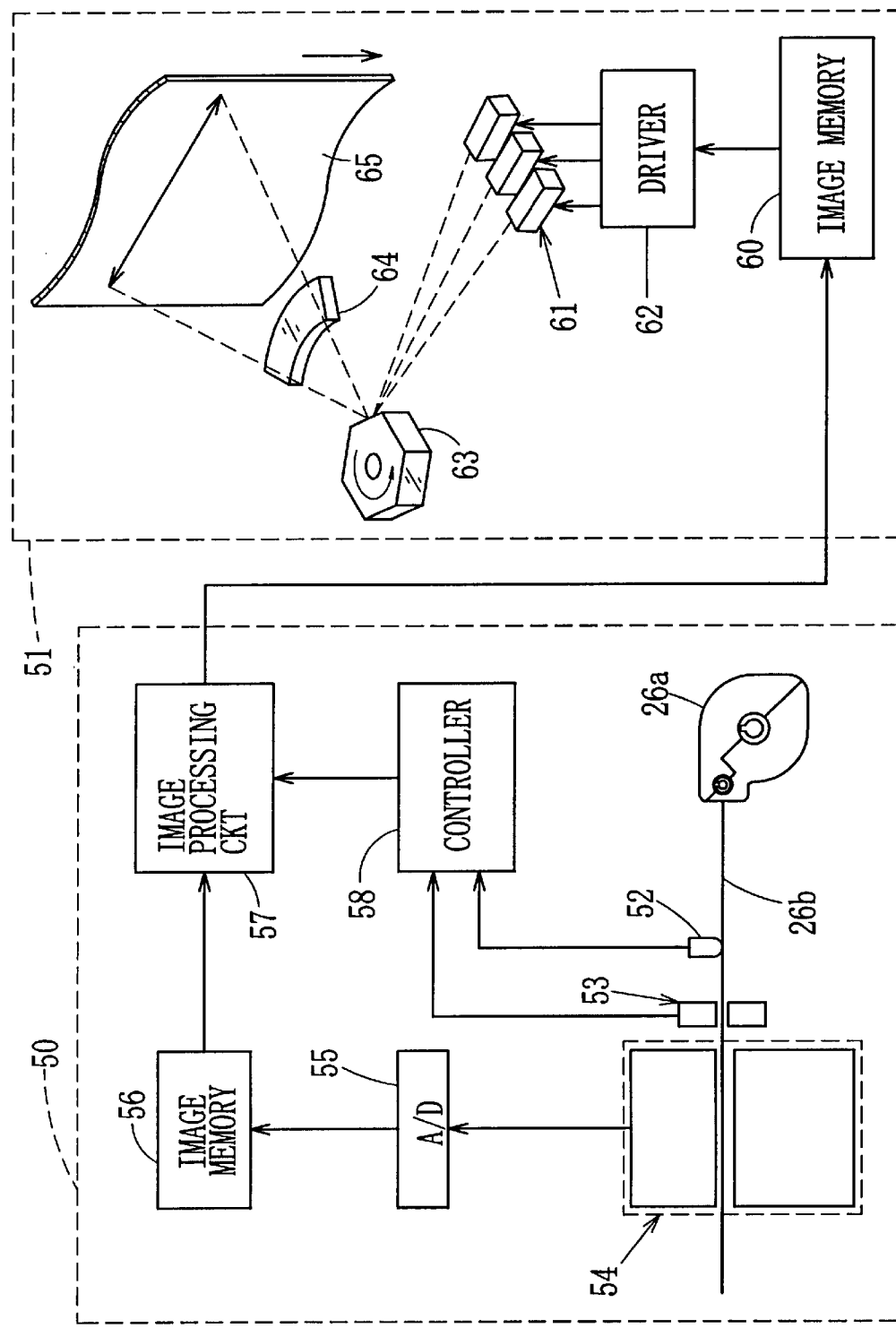
FIG. 4 is a schematic diagram of a digital printer.

FIG. 4 show a digital printer for making photo-prints from photographic frames photographed on photo film. The digital printer fundamentally has the same construction as conventional, but is installed with a control program for making photo-prints of superior tone-reproduction even from those filmstrips 26b exposed by the indoor film unit.

The digital printer consists of an input section 50 and an output section 51. The input section 50 includes a magnetic head 52, a photo sensor 53, an image scanner 54, an A/D converter 55, an image memory 56, an image processing circuit 57, a film feeding mechanism (not shown) for feeding the exposed and developed filmstrip 26b toward the image scanner 54, and a controller 58 for controlling these elements of the digital printer. While the filmstrip 26b is fed to the image scanner 54, the magnetic head 52 reads out data recorded on the magnetic recording layer of the filmstrip 26b, and sends it to the controller 58. Also while the filmstrip 26b is fed to the image scanner 54, the photo sensor 53 reads bar codes on the filmstrip 26b, and sends data represented by the bar codes to the controller 58. The controller 58 uses the data read out from the filmstrip 26b for controlling image processing in the image processing circuit 57.

The image scanner 54 is constituted of a film carrier, an illumination device for illuminating each photographic frame positioned in the film carrier, a CCD image sensor and an image forming lens for forming an image on the CCD image sensor. Because the construction of the image scanner 54 is conventional, these elements are omitted from the drawings. Each time the filmstrip 26b is fed by one frame, the CCD image sensor detects red, green and blue photoelectric signals from the photographic frame according to a three-color separation photometry method, and the image scanner 54 sends out the photoelectric signals to the A/D converter 55. The A/D converter 55 converts the photoelectric signals into red, green and blue digital image data, and the three-color image data of one frame is written for each color in the image memory 56. The image processing circuit 57 reads out the image data of one frame from the image memory 56, and processes it under the control of the controller 58.

The output section 51 includes an image memory 60 for storing processed image data from the image processing circuit 57, a laser unit 61 radiation red, green and blue laser beams, a driver for driving the laser unit 61 in accordance with the processed image data read out form the image memory 60, a polygon mirror 63, Fθ lens 64, and a not-shown feeding mechanism for feeding a long web of photographic paper 65 in a lengthwise direction shown by an arrow in FIG. 4. Because of the rapidly rotating polygon mirror 63, the laser beams sweep across the photographic paper 65 in a widthwise direction, while the photographic paper 65 is fed in the lengthwise direction. In this way, a full-color picture frame is recorded as a latent image on the photographic paper 65 in accordance with the processed image data. The photographic paper 65 is developed and finished in a conventional manner, to produce photo-prints.

Figure 5:
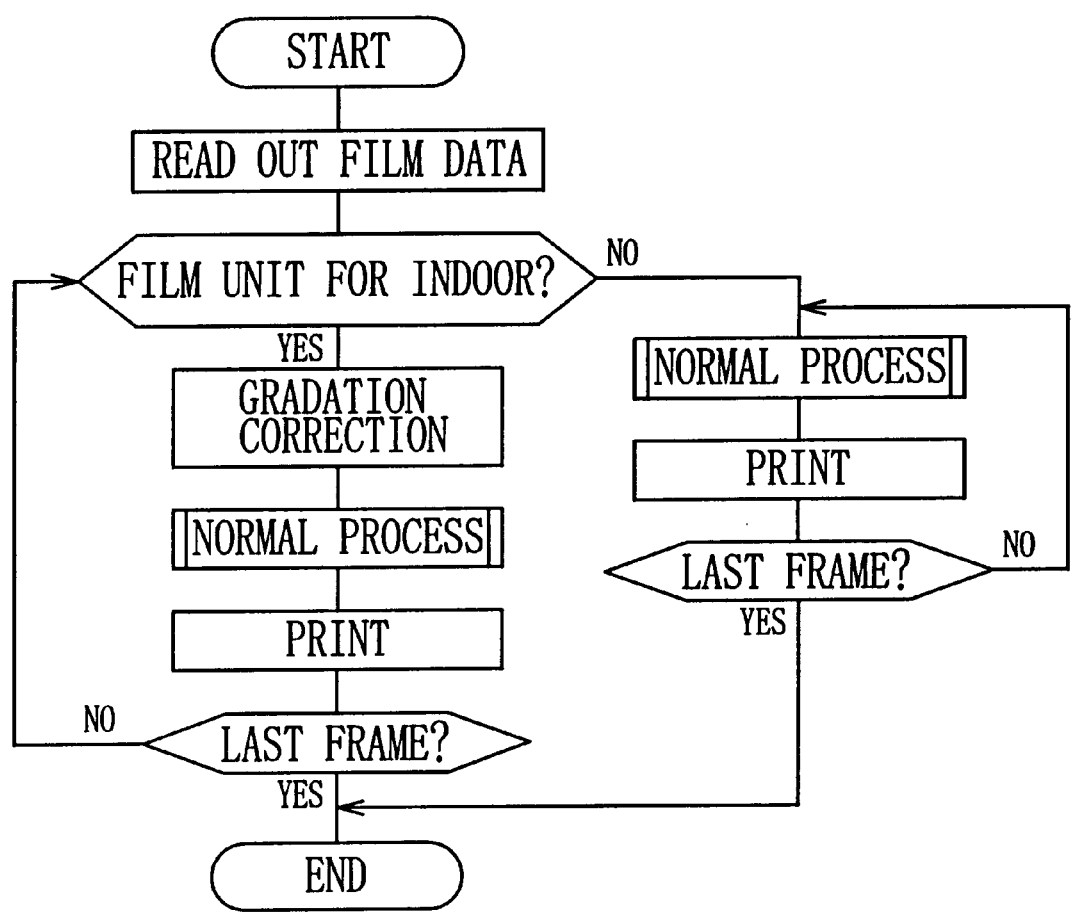
FIG. 5 is a flow chart illustrating an operation of the digital printer.

As shown in the flow chart of FIG. 5, the controller 58 checks the film type of the filmstrip presently set in the image scanner 54 with reference to the data read out through the magnetic head 52. If the controller 58 determines that the presently set filmstrip is that has been contained in and exposed by the indoor film unit, it outputs a gradation correction command to the image processing circuit 57, for making a specific gradation correction in addition to ordinary image processing operations, such as a color correction.

In response to this command, the image processing circuit 57 first makes the specific gradation correction on the image data of one frame of the presently set filmstrip 26b. The image processing circuit 57 previously memorizes data of characteristic curves for red, green and blue of this filmstrip 26b, so that the image processing circuit 57 can make the gradation correction with reference to the characteristic curves.

Figure 6:
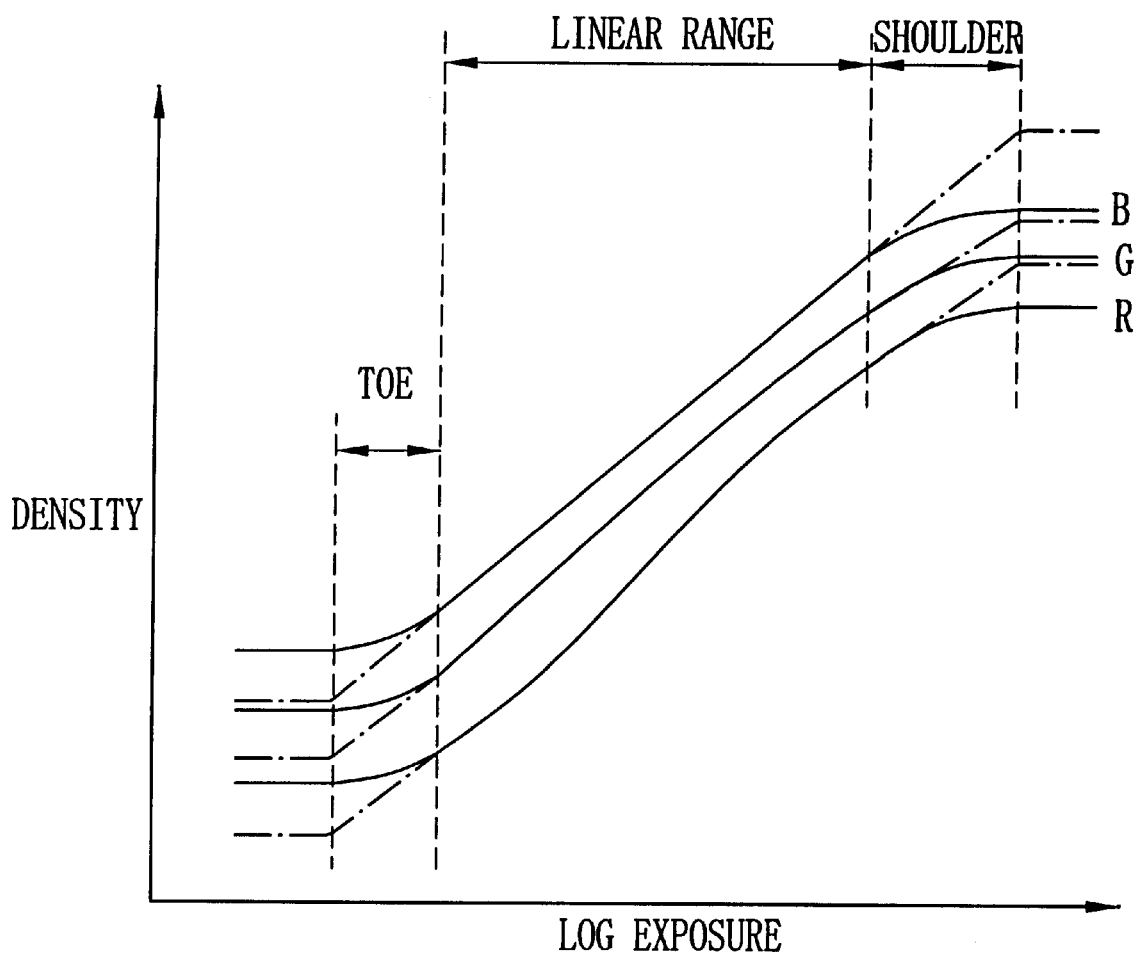
FIG. 6 is a graph illustrating density characteristic curves of a photo film.

As shown for example in FIG. 6, the characteristic curve of each color consists of a linear range where the density almost proportionally varies with the exposure amount, that is called the latitude, and a toe and a shoulder where the density does not proportionally vary with the exposure amount. In the specific gradation correction for the image data picked up from the filmstrip 26b photographed by the indoor film unit, the image processing circuit 57 corrects image data pieces of under-exposed image areas so as to make the gradient of the toe virtually as linear as the linear range. Thereby, even under-exposed image areas are reproduced with satisfactory tone-gradations on the photo-print as printed on the basis of the processed image data. By converting densities of image data pieces of over-exposed image areas so as to make the gradient of the shoulder virtually as linear as the linear range, over-exposed image areas are reproduced with satisfactory tone-gradations.

After this specific gradation correction, the image processing circuit 54 decides based on the corrected image data what density range of the frame is to be optimized in color-reproduction, and also the direction and degree of the color correction. Then, the image processing circuit 54 subjects the three-color image data to the ordinary image processing based on these decisions.

The image data of one frame processed in this way is written in the image memory 60, and the laser unit 61 is driven by the driver 62 in accordance with this image data in the same way as described above.

The consequent photo-print is improved in tome-reproduction as well as in color-reproduction, even if it contains a main subject illuminated by the flashlight and a dark background or a background illuminated by fluorescent light.

EXAMPLES

Numerical values specifying Examples of indoor film units according to the present invention and a comparative example are shown in Tables 4 to 11, wherein the system sensitivity is a value defined by the formula: $2\log_2(A)+\log_2(1/T)=\log_2(0.3 \cdot S)$, and $a^*$ and $b^*$ are CIELAB chromaticness indices measured according to the above described sequence and by use of a photographic paper produced by Fuji Photo Film Co., Ltd.

Example 1

Numerical values of the first Example are as follows:

TABLE 4

| | |
|---|---|
| APERTURE SIZE: A | F5.6 |
| SHUTTER SPEED: T | 1/30 (sec.) |
| GUIDE NUMBER: G | 5.0 (ISO100 · m) |
| FOCUS POINT | 2.3 m |
| FILM SPEED | ISO800 |
| SYSTEM SENSITIVITY | 2.0 |
| $\log_2(G^2) + \log_2(1/T)$ | 9.6 |
| $a^*$ | 4.2 |
| $b^*$ | 5.3 |
| $\sqrt{(a^*)^2 + (b^*)^2}$ | 6.8 |
| $\tan^{-1}(b^*/a^*)$ | 51.6° |

Figure 7:
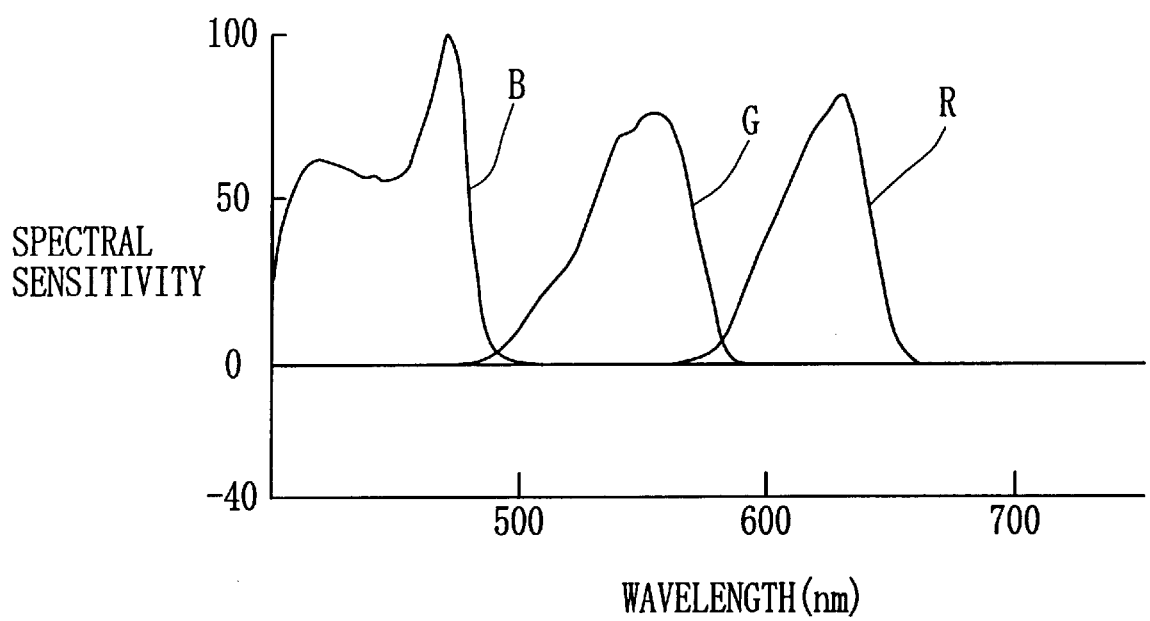
FIG. 7 is a graph illustrating spectral sensitivity curves of a photo film according to a first example of the present invention.

The IX240 type filmstrip 26b used in the first Example has a fourth photosensitive emulsion layer sensitive to light components of around 520 nm, in between green and red photosensitive emulsion layers of the primary three color layers. By using large size silver halide particles, the film speed of ISO800 is achieved in this film type. Spectral sensitivity of the filmstrip 26b of the first Example is shown in FIG. 7.

Figure 8:
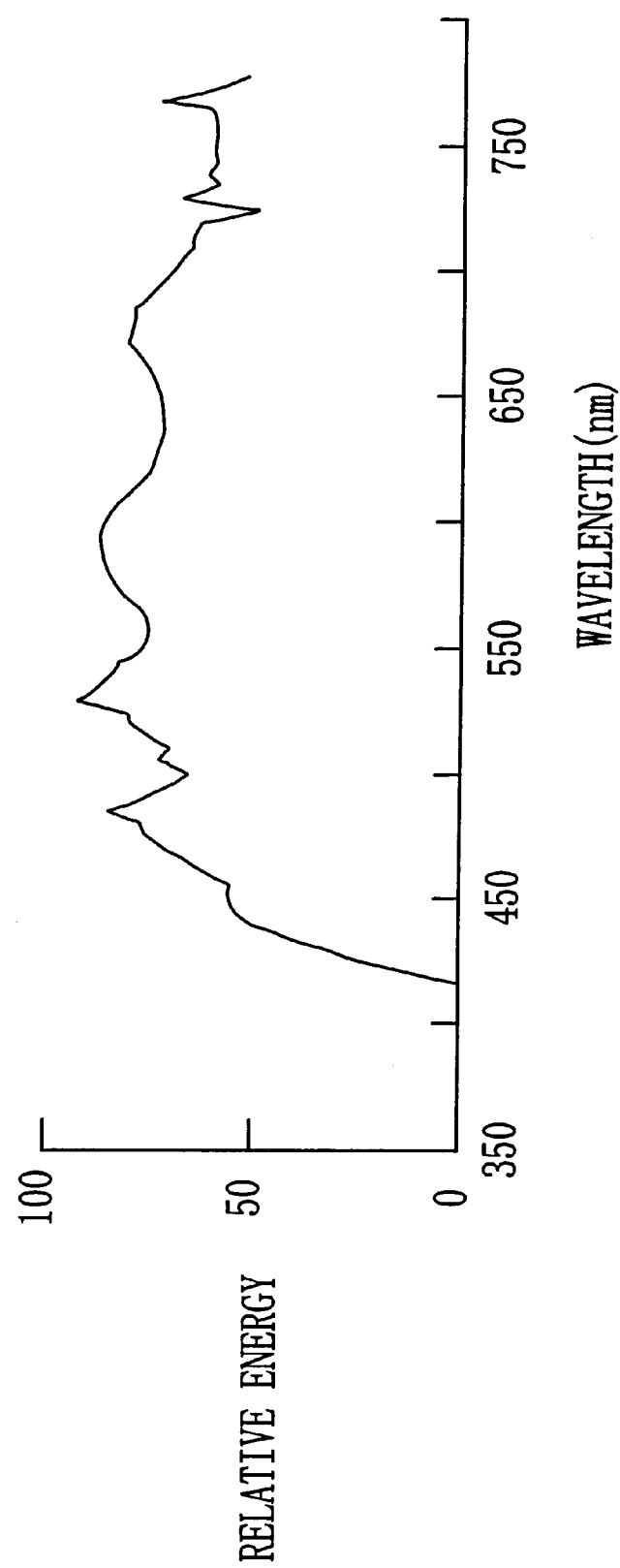
FIG. 8 is a graph illustrating spectral energy of a flashlight according to the first example of the present invention.
Figure 9:
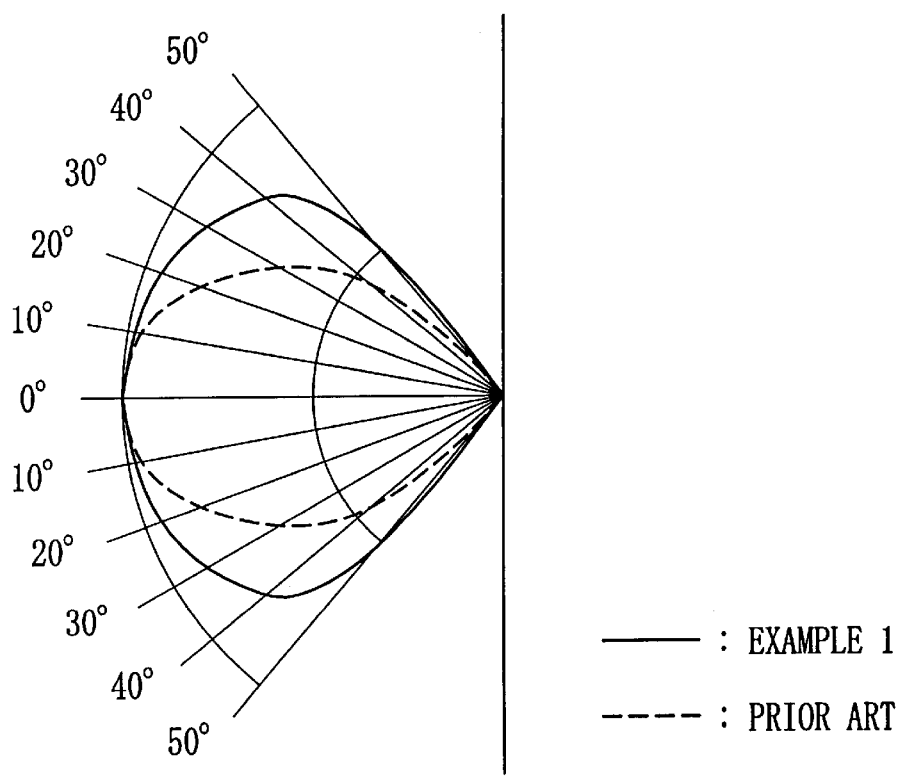
FIG. 9 is a graph illustrating light distribution characteristics of the flashlight according to the first example of the present invention.
Figure 12:
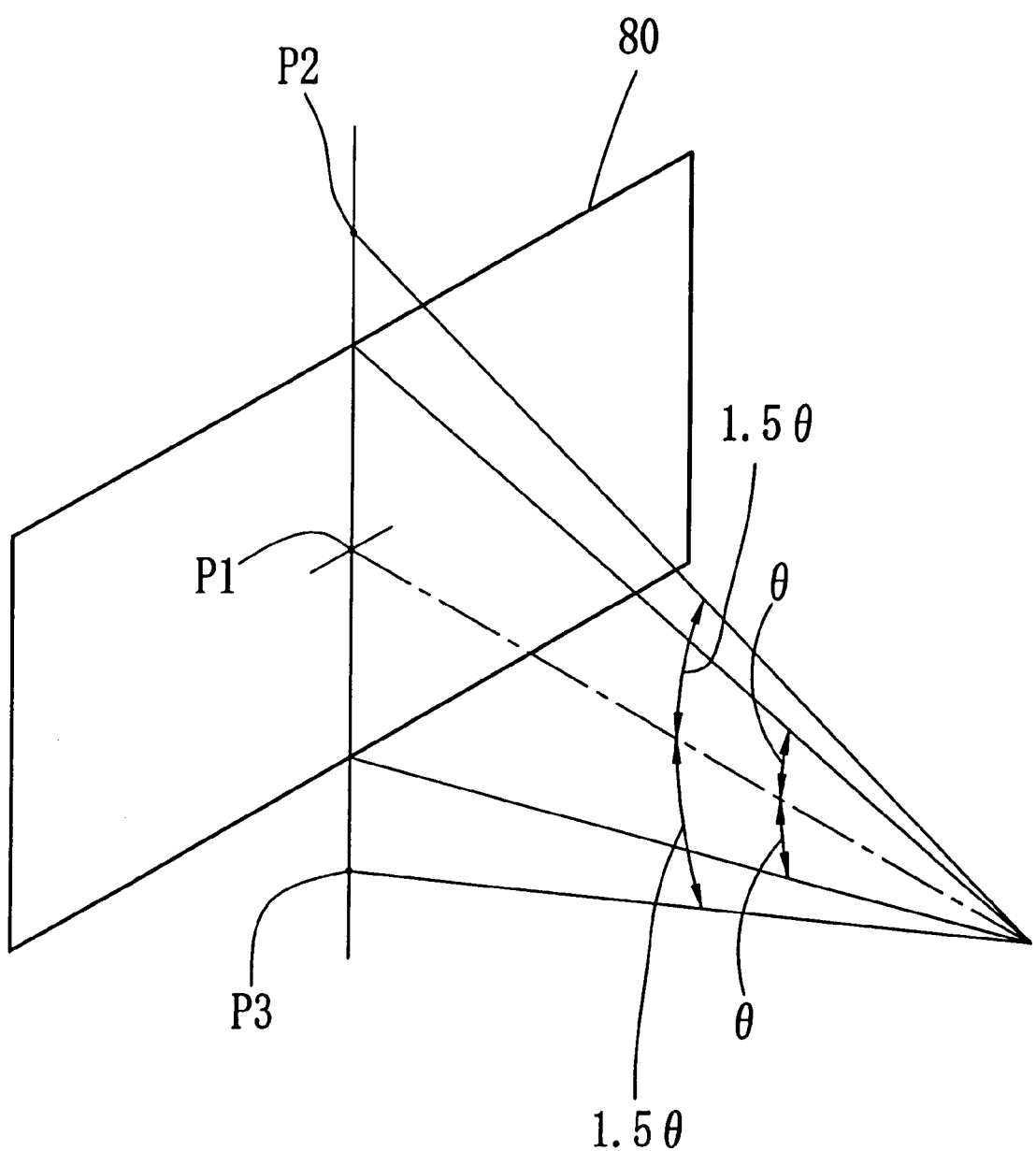
FIG. 12 is an explanatory diagram illustrating a relationship between an angle 2θ of a photographic field and an illuminating angle of a flash device.

Spectral energy of the flash device 23 of the first Example is adjusted by providing a dye filter in front of the protector 7a. The spectral energy of the flash device of the first Example is shown in FIG. 8. Light distribution characteristics of the flash device 23 of the first Example are adjusted by placing the diffusion plate 7b in front of the protector 7a. A solid line in FIG. 9 shows the light distribution characteristic curve of the first Example in the vertical direction. In this example, the angle θ of the photographic field 80 in the definition of FIG. 12 is 25°, the amount of flashlight at the points P2 and P3 of 1.5θ above and below the photographic field 80 is 84% of that at the center point P1 of the photographic field 80.

As seen from Table 4, the indoor film unit of the first Example satisfies the most preferable condition of the system sensitivity for the first requirement:

$$1 \leq 2\log_2(A)+\log_2(1/T)-\log_2(0.3 \cdot S) \leq 3$$

The guide number of the first Example is included in the most preferable range of from 3 to 5 for the second require-ment. The first Example also satisfies the most preferable condition for the second requirement:

$$8.0 \leq \log_2(G^2)+\log_2(1/T) \leq 10.0$$

Since the film speed is ISO800, the first Example satisfies the condition for the third requirement, that the film speed should not be less than ISO640. The first Example also satisfies the condition (II) for the fourth requirement.

The first Example can take an indoor photograph whose main subject illuminated by the flashlight and the background illuminated by a room light are reproduced very well on the photo-print. Although the aperture size A is relatively small, the in-focus range is sufficient enough for indoor-photography. The filmstrip 26b of the first Example is superior in light source suitability, so the light source color of the fluorescent lamp is properly reproduced. By setting the light source color of the flashlight to be slightly shifted toward yellow, the color of the main subject illuminated by the flashlight can be reproduced well even where the fluorescent light illuminates the background.

It is preferable to provide the indoor film unit of the first Example with a control switch for controlling the aperture size, the shutter speed, and the guide number in response to the ON-OFF operation of the flash switch 15 in the way as shown in Table 5. Thereby, the indoor film unit can photograph a wide variety of scenes ranging from daylight synchronized photography to indoor photography without flash that is required in museums or the like.

TABLE 5

| | | | | |
|---|---|---|---|---|
| CONTROL SWITCH | ON | ON | OFF | OFF |
| FLASH SWITCH | ON | OFF | ON | OFF |
| APERTURE SIZE | F5.6 | F5.6 | F11 | F11 |
| SHUTTER SPEED (sec.) | 1/30 | 1/30 | 1/120 | 1/120 |
| GUIDE NUMBER (ISO100 · m) | 5.0 | 0 | 10.0 | 0 |

Example 2

Numerical values of the second Example of the indoor film unit of the present invention are shown in Table 6.

TABLE 6

| | |
|---|---|
| APERTURE SIZE: A | F8.0 |
| SHUTTER SPEED: T | 1/80 (sec.) |
| GUIDE NUMBER: G | 3.9 (ISO100 · m) |
| FOCUS POINT | 3.0 m |
| FILM SPEED | ISO3200 |
| SYSTEM SENSITIVITY | 2.4 |
| $\log_2(G^2) + \log_2(1/T)$ | 10.2 |
| $a^*$ | −2.2 |
| $b^*$ | 2.5 |
| $\sqrt{(a^*)^2 + (b^*)^2}$ | 3.3 |
| $\tan^{-1}(b^*/a^*)$ | 131.4° |

Figure 10:
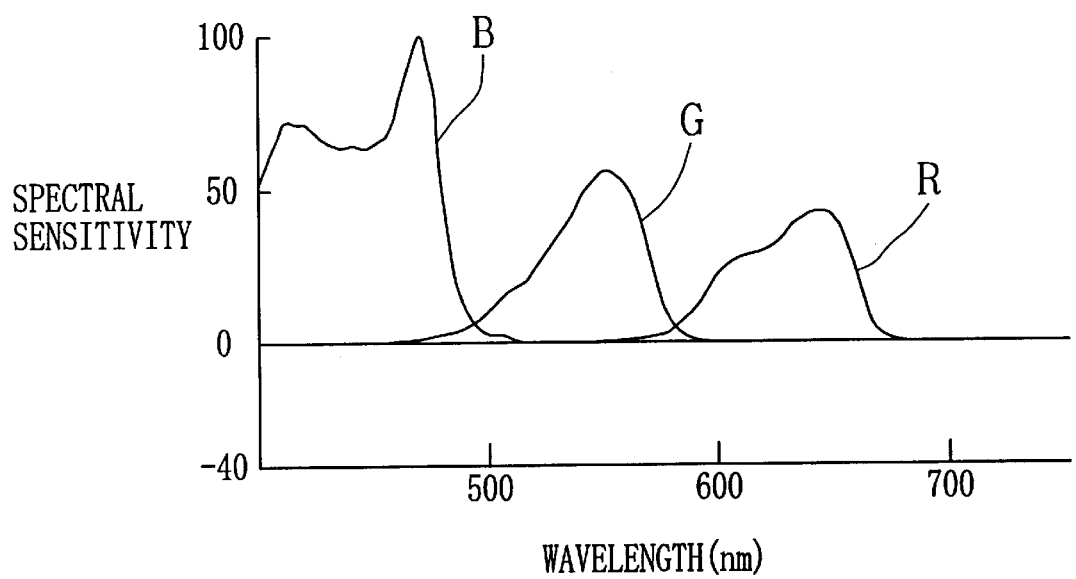
FIG. 10 is a graph illustrating spectral sensitivity curves of a photo film according to a second example of the present invention.

The second Example uses a high speed filmstrip of ISO3200 as the filmstrip 26b that is formed in a conventional manner using three primary color photosensitive emulsion layers and is not provided with the fourth photosensitive emulsion layers and is not provided with the fourth photosensitive emulsion layer. Because of the high-speed filmstrip 26b, it is possible to chose a large aperture size for providing a sufficient depth of field enough for any photographic circumstances as well as a high shutter speed that reduces the possibility of the handshake to a minimum. Spectral sensitivity of the filmstrip 26b of the second Example is determined while putting the most importance on the film speed, such that overlapping ranges between the three colors are made as small as possible. The spectral sensitivity of the filmstrip 26b used in the second Example is shown in FIG. 10.

Figure 11:
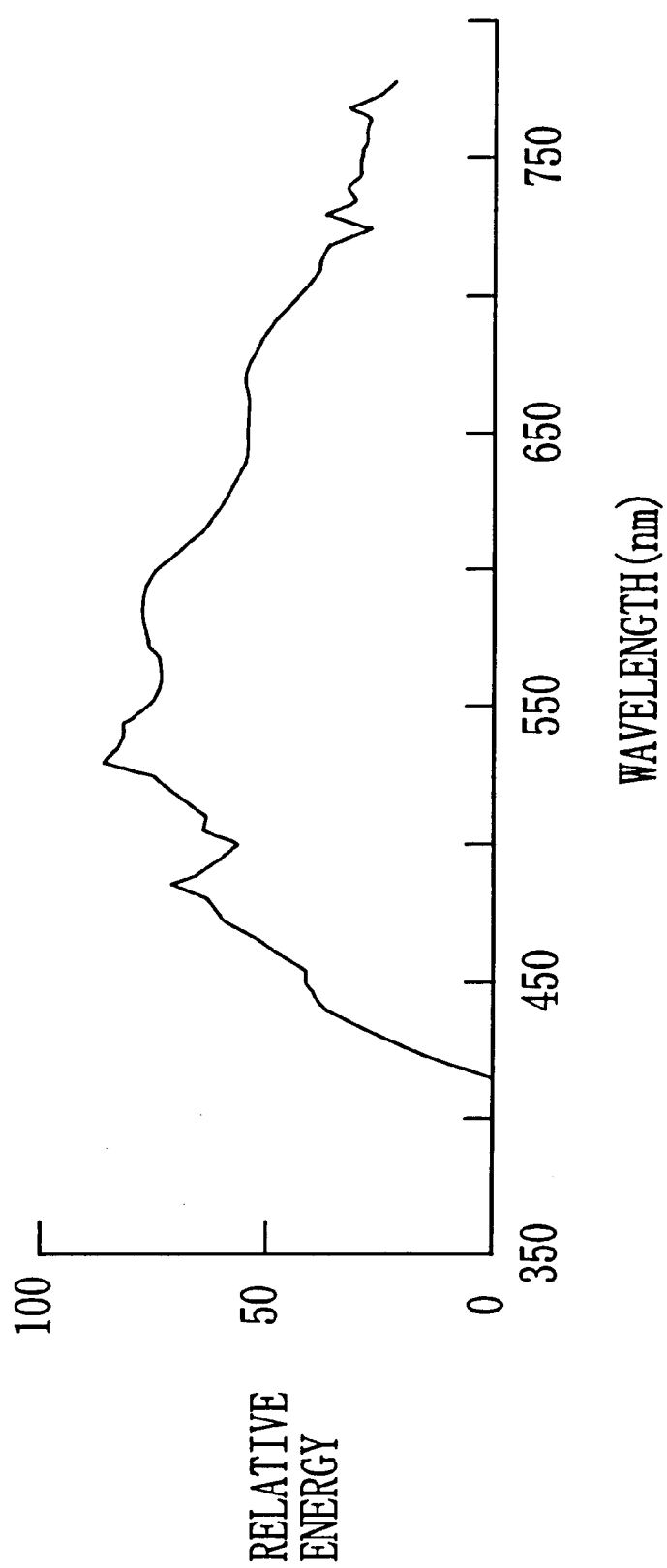
FIG. 11 is a graph illustrating spectral energy of a flashlight according to the second example of the present invention.

Spectral energy of the flashlight of the second Example is as shown in FIG. 11. The light-source color of the flashlight is adjusted such that the color of the main subject illuminated by the flashlight and the color of background illuminated by the fluorescent light as well are reproduced adequately.

Also in the second Example, the diffusion plate 7b is disposed in front of the protector 7a, so as to obtain the same light distribution characteristics as the first Example. Also in this example, the vertical angle θ of the photographic field 80 in the definition of FIG. 12 is 25°, and the amount of flashlight at the points P2 and P3 of 1.5θ above and below the photographic field 80 is 84% of that at the center point P1 of the photographic field 80.

As seen from Table 6, the indoor film unit of the second Example satisfies the most preferable condition of the system sensitivity:

$$1 \leq 2\log_2(A) + \log_2(1/T) - \log_2(0.3 \cdot S) \leq 3$$

The guide number of the second Example is included in the most preferable range of from 3 to 5. The second Example also satisfies the preferable condition for the second requirement:

$$7.0 \leq \log_2(G^2) + \log_2(1/T) \leq 12.0$$

Since the film speed is ISO3200, the second Example satisfies the condition of the film speed that it should not be less than ISO1000. The second Example also satisfies both the condition (I) and the condition (II) for the fourth requirement.

Example 3

Numerical values of the third Example of the indoor film unit of the present invention are shown in Table 7. It is to be noted that the diffusion plate 7b is disposed in front of the protector 7a in the third Example. Light distribution characteristics and the vertical angle θ of the photographic field 80 are equal to those of the first Example.

TABLE 7

| APERTURE SIZE: A | F6.4 |
|---|---|
| SHUTTER SPEED: T | 1/70 (sec.) |
| GUIDE NUMBER: G | 3.2 (ISO100 · m) |
| FOCUS POINT | 2.5 m |
| FILM SPEED | ISO2000 |
| SYSTEM SENSITIVITY | 2.2 |
| $\log_2 (G^2) + \log_2 (1/T)$ | 9.5 |
| a* | 2.8 |
| b* | 3.5 |
| $\sqrt{\{(a^*)^2 + (b^*)^2\}}$ | 4.5 |
| $\tan^{-1} (b^*/a^*)$ | 51.4° |

As seen from Table 7, the indoor film unit of the third Example satisfies the most preferable condition of the system sensitivity:

$$1 \leq 2\log_2(A) + \log_2(1/T) - \log_2(0.3 \cdot S) \leq 3$$

The guide number of the third Example is included in the most preferable range of from 3 to 5. The third Example also satisfies the most preferable condition for the second requirement:

$$8.0 \leq \log_2(G^2) + \log_2(1/T) \leq 10.0$$

Since the film speed is ISO2000, the third Example satisfies the condition of the film speed that it should not be less than ISO1000. The third Example also satisfies the condition (I) and the condition (II) for the fourth requirement.

The filmstrip 26b used in the third Example is provided with the fourth photosensitive emulsion layer in the same way as in the first Example. Also, it is designed to have slightly softer characteristics than ordinary color negative film, to elongate the latitude by about 0.6 in the logarithmic value of exposure (logE).

As for the indoor film unit of the third Example, characteristic curves of the filmstrip 26b were registered in the digital printer having the above-described specific gradation correction function. By correcting gradation of image data of photographs taken by the third Example to elongate the virtual latitude, those pictures photographed at an exposure value EV (corresponding to ISO100) of about 5.0 to 16.5 were printed with adequate color- and tone-reproductions.

Comparative Example

Comparative experiments were also made to compare the indoor film unit of the third Example with a conventional film unit. Numerical values of the conventional film unit used as the comparative example are shown in Table 8, wherein the comparative example is designed to be able to take photographs in a range from EV9 to EV16. A flash device used in the comparative example has light distribution characteristics as shown by dashed lines in FIG. 9. In the comparative example, the vertical angle θ of the photographic field 80 in the definition of FIG. 12 is 25°, and the amount of flashlight at the points of 1.5θ was 53%.

TABLE 8

| APERTURE SIZE: A | F10 |
|---|---|
| SHUTTER SPEED: T | 1/120 (sec.) |
| GUIDE NUMBER: G | 10 (ISO100 · m) |
| FOCUS POINT | 4.5 m |
| FILM SPEED | ISO800 |
| SYSTEM SENSITIVITY | 5.6 |
| $\log_2 (G^2) + \log_2 (1/T)$ | 13.6 |
| a* | −9.5 |
| b* | 20.1 |
| $\sqrt{\{(a^*)^2 + (b^*)^2\}}$ | 22.2 |
| $\tan^{-1} (b^*/a^*)$ | 115.4° |

The comparative experiments were made photographing 200 indoor and night scenes with the flashlight and 50 daylight scenes by each of the indoor film unit of the third Example and thee comparative example, and printing the photographed scenes by the digital printer having the specific gradation correction function.

According to the results of examinations, tone-reproduction as well as color-reproduction of the photo-prints obtained through the first Example was excellent in view of the main subject and the background. On the contrary, the photo-prints obtained through the comparative example include a remarkable number of indoor and night scenes where the background was almost black, and all of the indoor and night photographs provided murky impression. Furthermore, among the photo-prints obtained through the comparative example, gradations of some human subjects were white-compressed due to over-exposure.

Also an organoleptic test was made on each of the 200 scenes by twenty examiners, comparing the photo-print obtained through the third Example with the photo-print of the same scene obtained through the comparative example, and choosing which photo-print is preferable. The results are shown in Table 9. As obvious from Table 9, the photo-prints obtained through the indoor film unit of the third Example of the present invention gained a sweepingly good reputation.

TABLE 9

|  | INDOOR FILM UNIT (EXAMPLE 3) | CONVENTIONAL FILM UNIT (COMPARATIVE EXAMPLE) |
|---|---|---|
| INDOOR & NIGHT (EV2 to EV9.5) | 98% | 2% |
| DAYLIGHT (EV8.5 to EV15.7) | 87% | 13% |

Example 4

Numerical values of the fourth Example of the indoor film unit of the present invention are shown in Table 8. It is to be noted that the diffusion plate 7b is disposed in front of the protector 7a in the fourth Example. Light distribution characteristics and the vertical angle θ of the photographic field 80 are equal to those of the first Example.

TABLE 10

| APERTURE SIZE: A | F5.6 |
|---|---|
| SHUTTER SPEED: T | 1/60 (sec.) |
| GUIDE NUMBER: G | 3.5 (ISO100 · m) |
| FOCUS POINT | 2.0 m |
| FILM SPEED | ISO1600 |
| SYSTEM SENSITIVITY | 2.0 |
| $\log_2(G^2) + \log_2(1/T)$ | 9.6 |
| a* | 2.8 |
| b* | 3.5 |
| $\sqrt{(a^*)^2 + (b^*)^2}$ | 4.5 |
| $\tan^{-1}(b^*/a^*)$ | 51.4° |

As seen from Table 10 the indoor film unit of the fourth Example satisfies the most preferable condition of the system sensitivity:

$$1 \leq 2\log_2(A) + \log_2(1/T) - \log_2(0.3 \cdot S) \leq 3$$

The guide number of the fourth Example is included in the most preferable range of from 3 to 5. The fourth Example also satisfies the most preferable condition for the second requirement:

$$8.0 \leq \log_2(G^2) + \log_2(1/T) \leq 10.0$$

Since the film speed is ISO1600, the fourth Example satisfies the condition of the film speed that it should not be less than ISO1000. The fourth Example also satisfies the condition (I) and the condition (II) for the fourth requirement.

The filmstrip 26b used in the third Example is provided with the fourth photosensitive emulsion layer in the same say as in the first Example.

In the fourth Example, the aperture size and the shutter speed vary in cooperation with the flash ON-OFF operation member 8, i.e., the ON-OFF of the flash switch 15 in the way as shown in Table 11.

TABLE 11

| FLASH SWITCH | APERTURE SIZE: A | SHUTTER SPEED: T |
|---|---|---|
| ON | F5.6 | 1/60 (sec.) |
| OFF | F12.5 | 1/145 (sec.) |

When the flash switch 15 is OFF, the aperture size is reduced, and the shutter speed is increased, so as to adjust to the daylight photography. Since the photographer does not need to make a specific operation for the switching of the aperture size and the shutter speed, this indoor film unit makes it easy to take high quality pictures in daylight photography as well as flash-photography.

Examples 5 to 8

The indoor film units of the fifth to eighth Examples have the same numerical values as the first to fourth Examples respectively, except that each of the fifth to eighth Examples uses a 135-type photo filmstrip. The fifth to eighth Examples were examined in the same way as for the first to fourth Examples. According to the results of the examinations, the same effects as above were achieved by the fifth to eighth Examples.

What is claimed is:

1. A lens-fitted photo film unit containing a roll of unexposed filmstrip and having photographic mechanisms including a taking lens, a shutter mechanism and a stop, wherein the film unit can take photographs at a shutter speed T of the shutter mechanism and an aperture size A of the stop, the shutter speed T in the unit of second and the aperture size A satisfying the following condition:

$$-6 \leq 2\log_2(A) + \log_2(1/T) - \log_2(0.3 \cdot S) \leq 5$$

wherein S represents an ISO film speed of the filmstrip.

2. A lens-fitted photo film unit as claimed in claim 1, wherein the shutter speed T, the aperture size A and the ISO film speed S of the filmstrip satisfying the following condition:

$$-2 \leq 2\log_2(A) + \log_2(1/T) - \log_2(0.3 \cdot S) \leq 4.$$

3. A lens-fitted photo film unit as claimed in claim 2, wherein the shutter speed T, the aperture size A and the ISO film speed S of the filmstrip satisfying the following condition:

$$1 \leq 2\log_2(A) + \log_2(1/T) - \log_2(0.3 \cdot S) \leq 3.$$

4. A lens-fitted photo film unit as claimed in claim 1, wherein the ISO film speed of the filmstrip is not less than 640, and more preferably not less than 1000.

5. A lens-fitted photo film unit as claimed in claim 1, further comprising a flash device for projecting a flashlight toward a photographic subject, wherein the flash device has a guide number (ISO100·m) in a range from 0.1 to 8, more preferably from 1 to 6, and most preferably from 3 to 5.

6. A lens-fitted photo film unit as claimed in claim 1, further comprising a flash device for projecting a flashlight toward a photographic subject, wherein the film unit satisfies the following condition:

$$8.0 \leq \log_2 (G^2) + \log_2 (1/T) \leq 12.0$$

wherein G represents a guide number (ISO100·m) of the flash device.

7. A lens-fitted photo film unit as claimed in claim 6, wherein the guide number (ISO100·m) is set in a range from 0.1 to 8, more preferably from 1 to 6, and most preferably from 3 to 5.

8. A lens-fitted photo film unit as claimed in claim 5, wherein the amount of flashlight at points which are located on an object plane above and below a photographic field, each at a vertical angle of 1.5θ relative to a center point of the photographic field, is not less than 60%, and more preferably not less than 80%, of the amount of flashlight at the center point of the photographic field, wherein θ represents a vertical angle of a top margin or a bottom margin of the photographic field relative to the center point of the photographic field.

9. A lens-fitted photo film unit as claimed in claim 8, wherein the flash device has a diffusion plate on its front side for providing a wide illuminating angle of the flash device.

10. A lens-fitted photo film unit as claimed in claim 1, wherein the film unit further comprises a flash device for projecting a flashlight toward a photographic subject, the film unit satisfying one of the following conditions:

I: $0 \leq \sqrt{\{(a^*)^2 + (b^*)^2\}} \leq 5.0$ or

II: $0 \leq \sqrt{\{(a^*)^2 + (b^*)^2\}} 15.0$ and $0° \leq Y \leq 100°$; or

III: $0 \leq \sqrt{\{(a^*)^2 + (b^*)^2\}} \leq 15.0$ and $210° \leq Y \leq 360°$ wherein a* and b* represent chromaticness indices in CIE 1976 L*a*b* color, and Y=0° when a*, b*=0, and Y=tan$^{-1}$ (b*/a*) when a* or b* is not zero, wherein $0° \leq \tan^{-1} (b^*/a^*) \leq 90°$ when a*>0 and b*≧0

$90° \leq \tan^{-1} (b^*/a^*) \leq 180°$ when a*≦0 and b*≧0

$180° \leq \tan^{-1} (b^*/a^*) \leq 270°$ when a*<0 and b*≦0

$270° \leq \tan^{-1} (b^*/a^*) \leq 360°$ when a*>0 and b*≦0 and wherein the chromaticness indices a* and b* are measured by the steps of:
- exposing the filmstrip at a proper level to light reflected from a gray reflection plate with a reflection factor of 18% while projecting flashlight from the flash device toward the gray reflection plate;
- exposing the filmstrip at a proper level to light reflected from the gray reflection plate while illuminating it by a fluorescent lamp of F6 type by JIS Z 8719 toward the gray reflection plate;
- printing the image of the gray reflection plate photographed by use of the fluorescent light onto a photographic paper under such a printing condition, under which CIELAB chromaticness indices a* and b* of the gray reflection plate photographed by use of the flashlight and printed on the same photographic paper have a value zero (a*, b*=0); and
- measuring CIELAB chromaticness indices a* and b* of the gray reflection plate printed on the photographic paper.

11. A lens-fitted photo film unit containing a roll of unexposed film and having photographic mechanisms including a taking lens and a shutter mechanism, and a flash device for projecting a flashlight toward a photographic subject, wherein the film unit satisfies the following conditions:

$$8.0 \leq \log_2 (G^2) + \log_2 (1/T) \leq 12.0$$

wherein G represents a guide number (ISO100·m) of the flash device, and T represents a shutter speed T of the shutter mechanism in the unit of second.

12. A lens-fitted photo film unit as claimed in claim 11, wherein the flash device has a guide number (ISO100·m) in a range from 0.1 to 8, more preferably from 1 to 6, and most preferably from 3 to 5.

13. A lens-fitted photo film unit as claimed in claim 11, wherein the ISO film speed of the filmstrip is not less than 640, and more preferably not less than 1000.

14. A lens-fitted photo film unit as claimed in claim 11, wherein the film unit satisfies when the film unit satisfies one of the following conditions:

I: $0 \leq \sqrt{\{(a^*)^2 + (b^*)^2\}} \leq 5.0$; or

II: $0 \leq \sqrt{\{(a^*)^2 + (b^*)^2\}} 15.0$ and $0° \leq Y \leq 100°$; or

III: $0 \leq \sqrt{\{(a^*)^2 + (b^*)^2\}} \leq 15.0$ and $210° \leq Y \leq 360°$ wherein a* and b* represent chromaticness indices in CIE 1976 L*a*b* color, and Y=0° when a*, b*=0, and Y=tan$^{-1}$ (b*/a*) when a* or b* is not zero, wherein $0° \leq \tan^{-1} (b^*/a^*) \leq 90°$ when a*>0 and b*≧0

$90° \leq \tan^{-1} (b^*/a^*) \leq 180°$ when a*≦0 and b*>0

$180° \leq \tan^{-1} (b^*/a^*) \leq 270°$ when a*<0 and b*≦0

$270° \leq \tan^{-1} (b^*/a^*) \leq 360°$ when a*>0 and b*≦0 and wherein the chromaticness indices a* and b* are measured by the steps of:
- exposing the filmstrip at a proper level to light reflected from a gray reflection plate with a reflection factor of 18% while projecting flashlight from the flash device toward the gray reflection plate;
- exposing the filmstrip at a proper level to light reflected from the gray reflection plate while illuminating it by a fluorescent lamp of F6 type by JIS Z 8719 toward the gray reflection plate;
- printing the image of the gray reflection plate photographed by use of the fluorescent light onto a photographic paper under such a printing condition, under which CIELAB chromaticness indices a* and b* of the gray reflection plate photographed by use of the flashlight and printed on the same photographic paper have a value zero (a*=0, and b*=0); and
- measuring CIELAB chromaticness indices a* and b* of the gray reflection plate printed on the photographic paper.

15. A method for making photo-prints comprising the steps of:
- photographing picture frames on a filmstrip by a lens-fitted photo film unit with a flash device, at a shutter speed and an aperture size that satisfy the following conditions:

$$-6 \leq 2\log_2(A)+\log_2(1/T)-\log_2(0.3 \cdot S) \leq 5$$

$$8.0 \leq \log_2(G^2)+\log_2(1/T) \leq 12.0$$

wherein A, T, S and G represent the aperture size, the shutter speed in the unit of second, and ISO film speed of the filmstrip, and a guide number (ISO100·m) of the flash device respectively;

picking up image data from the picture frames;

processing the image data so as to virtually elongate latitudes of characteristic curves of the filmstrip in an under-exposure range; and printing images on the basis of processed image data.

* * * * *